United States Patent [19]

Kao et al.

[11] 4,266,217
[45] May 5, 1981

[54] SIGNAL DEVICE FOR FISHING RODS

[76] Inventors: Dai-Hae Kao, 214-1 Shih-Erh-Tien-Dong Li; Shii-San Shieh, 27, Hsin Liao, Lin 2, Chang An Li, both of An Nan Chue, Tainan, Taiwan

[21] Appl. No.: 146,138

[22] Filed: May 2, 1980

[51] Int. Cl.³ ............................................. A01K 97/12
[52] U.S. Cl. ...................................... 340/573; 43/17; 200/61.14; 340/668
[58] Field of Search .................... 340/573, 668; 43/17, 43/16; 200/61.14, 61.13

[56] References Cited

U.S. PATENT DOCUMENTS

| 2,446,427 | 8/1948 | Linder | 340/573 |
| 2,619,559 | 11/1952 | Schenkel | 340/573 |
| 3,835,462 | 9/1974 | Periman | 340/573 |
| 3,868,668 | 2/1975 | Woodbury | 340/573 |

Primary Examiner—Glen R. Swann, III

[57] ABSTRACT

A signalling device mounts on a fishing rod to signal a hooked fish. Two relatively movable contacts are axially aligned in the direction of the rod's length. An axial bore through the forward-most contact allows a string to pass therethrough and connect to the rear-most contact. The string clamps to the fishline, whereby the force of a hooked fish will close the contacts to actuate an alarm.

1 Claim, 2 Drawing Figures

SIGNAL DEVICE FOR FISHING RODS

BACKGROUND OF THE INVENTION

The present invention relates to a signal device for fishing rods which can send out signals to cause the angler to notice a fish is hooked. An angler always has to keep an eye on the float in order to react immediately when a fish is hooked and has hence less time to relax. When fishing in the dark or casting hook far away from the edge to catch bigger fish, the float can hardly be seen. Therefore, an angler can only feel a shaking of the fishing rod by hand when a fish is hooked. It is not easy to make a correct judgement in such manner.

SUMMARY OF THE INVENTION

A signal device for fishing rods according to the present invention comprises: an electric contact provided in a room located on the wall of a housing thereof, including an adjustable screw-like contact element with an axial through-hole therein, said contact element being screwed into a corresponding threaded inner cylindrical surface of a through-way communicating with said room so as to permit said adjustable screw-like contact element to extend from outside of said housing into said room; a slidable contact element within said room provided with an axial through-hole therein being substantially axially aligned with the through-way of said adjustable screw-like contact element and insulated from the inner wall of said room by an insulating device; and a spring disposed in said room and sleeving protruding part of said adjustable screw-like contact element;

an electric souder and/or a light having an electric wire for connecting to a positive terminal of a battery and a further electric wire for connecting to said insulated slidable contact element; and a string having a clamping element provided at an end thereof, the other end thereof being led through said axial through-hole of said adjustable contact element, said spring, and through-hole of said slidable contact element and secured finally to said slidable contact element. Said clamping element is used to clamp a tense fishing line, whereby the pulling force applied thereto from a hooked fish will be transmitted to said string to actuate said electric contact and to send out a signal.

The gap between said screw-like contact element and said slidable contact element can be adjusted by moving said screw-like contact element into or out of said room to adjust the sensitivity of the signal device.

An important object of the present invention is to provide a signal device, with which the angler can notice immediately when the fish is hooked without looking at the float.

This and other objects, features and advantages of the present invention will be more apparent in the following description of a preferred embodiment with reference to the accompanying drawings, in which:

DETAILED DESCRIPTION OF THE PREFERRED EMBODIMENT

Figure 1:
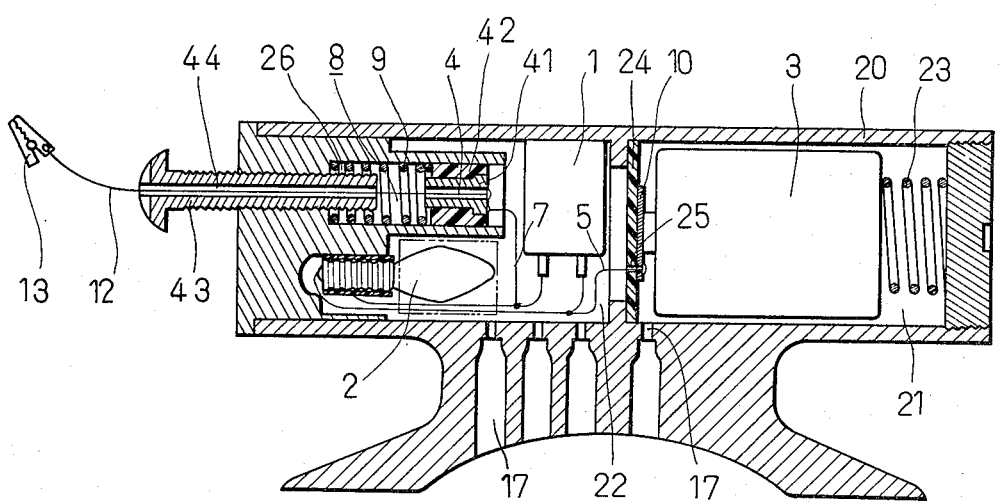
FIG. 1 is a side view of a signal device according to the present invention.

Referring to FIG. 1, there is shown a signal device according to the present invention which has a housing 20 of conductive material divided into two chambers 21, 22 by an insulated division plate 24. The rear chamber 21 has a spring conduct 23 provided on one side wall thereof and a conducting plate 10 on an opposite side wall for receiving detachable batteries 3 therebetween to secure a good electric connection. The conducting plate 10 fixed on the insulated division plate 24 is connected to terminals of a light 2 and a sounder 1 by means of a wire 5 which passes through a hole 25 provided on the insulated division plate 24. The inner wall of the front chamber 22 is provided with means for fixing the light 2 and the sounder 1.

An electric contact primarily provided in a room 26 at an end of the front chamber 22 as shown in FIG. 1 includes substantially an adjustable screw-like contact element 43 with an axial through hole 44 therein, a slidable contact element 41 with an axial hole 4 therein provided with an insulating device 42 so as to make it insulate from the inner wall of the room 26, and a spring 9 mounted between the screw-like contact element 43 and the slidable contact element 41. The screw-like contact element 43 is screwed into a corresponding threaded inner surface of a through-way extending into the room 26 thereby the adjustable screw-like contact element 43 may extend into the room 26 to adjust the distance between the screw-like contact element and the slidable contact element. The spring 9 substantially covers the protruding part of the adjustable contact element 43 and a part of the slidable contact element 41 and is attached to the insulating device 42. The spring 9 always keeps away from the slidable conducting element 41 during the operation of the signal device.

A string 12 having a clamp 13 provided at one end thereof is led through the axial through-hole 4 of the screw-like contact element 43 and of the slidable contact element 41 and is fixed to the slidable contact element 41. By means of an electric wire 7 the slidable contact element 41 is connected to the other terminal of the light 2 and the sounder 1.

Figure 2:
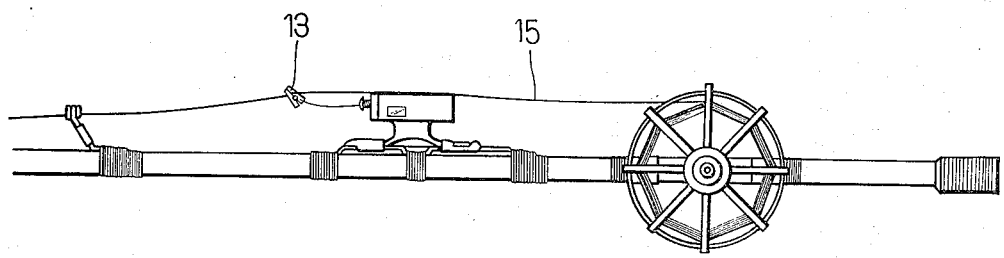
FIG. 2 is a schematic view of fishing rod provided with the signal device shown in FIG. 1.

Referring to FIGS. 1 and 2, the fishing line 15 shown in FIG. 2 is connected with the string 12 by the clamp 13. Thus, when a fish bites the bait thereof, the string 12 will be pulled by the tension of the fishing line 15. Through the pulling force the slidable contact element 41 will move towards the screw-like contact element 43 to switch on the light 2 and the sounder 1, the angler can then know immediately that he has caught a fish. When the tension of the fishing line 15 is released, the slidable electric contact element 41 will return to its original position by the compressed spring 9 and maintain switch-off state again.

The sensitivity of the signal device can be adjusted externally by screwing the screw-like contact element 43 into or out of the room 26.

The light of the signal device can be a incandescent lamp or an emitting diode.

With the invention thus explained, it is apparent that obvious modifications and variations can be made without departing from the scope of the invention. It is therefore intended that the invention be limited only as indicated in the appended claims.

What is claimed is:

1. A signal device for fishing rods comprising:

an electric contact primarily provided in a room located in a housing of said signal device and comprising an adjustable screw-like contact element having an axial through-hole therein, said contact element being screwed into a corresponding threaded inner surface of a through-way communicating with said room so as to permit said adjustable screw-like contact element to extend from outside of said housing into said room; a slidable contact element with an axial through-hole placed in said room substantially axially aligned with said through-way of said adjustable screw-like contact element and insulated from the inner wall of said room by an insulating device; a spring disposed in said room and surrounding the protruding part of said adjustable screw-like contact element, one end of said spring attaching firmly to said insulating device so as to avoid coming into contact with said slidable contact element during the operation of said signal device;

an electric sounder and/or a light having an electric wire for connecting to a terminal of a battery and further electric wire for connecting to said insulated slidable contact element; and a string having a clamping element provided at an end thereof and the other end thereof being led through said axial through-hole of said adjustable contact element, said spring, and through-hole of said slidable contact element and secured finally to said slidable contact element; said clamping element being used to clamp a tense fishing line, whereby a pulling force applied thereto from a hooked fish will be transmitted to said string to actuate said electric contact and produce a signal.

* * * * *